(12) United States Patent
Sacripante et al.

(10) Patent No.: US 9,738,759 B1
(45) Date of Patent: Aug. 22, 2017

(54) COLD PRESSURE FIX TONERS COMPRISING CRYSTALLINE CO-POLYESTER-CO-POLY(ALKYLSILOXANE)

(71) Applicant: XEROX CORPORATION, Norwalk, CT (US)

(72) Inventors: Guerino G. Sacripante, Oakville (CA); Kimberly D. Nosella, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/069,453

(22) Filed: Mar. 14, 2016

(51) Int. Cl.
*G03G 9/087* (2006.01)
*C08G 77/445* (2006.01)
*G03G 9/093* (2006.01)

(52) U.S. Cl.
CPC ........... *C08G 77/445* (2013.01); *G03G 9/087* (2013.01); *G03G 9/08755* (2013.01); *G03G 9/08773* (2013.01); *G03G 9/08788* (2013.01); *G03G 9/08797* (2013.01); *G03G 9/093* (2013.01); *G03G 9/09321* (2013.01)

(58) Field of Classification Search
CPC .......................... C08G 77/445; G03G 9/09321
See application file for complete search history.

(56) References Cited

U.S. PATENT DOCUMENTS

| | | | |
|---|---|---|---|
| 4,876,169 A * | 10/1989 | Gruber | G03G 9/08788 430/109.4 |
| 4,935,324 A | 6/1990 | Grushkin et al. | |
| 5,013,630 A | 5/1991 | Ong et al. | |
| 5,023,159 A | 6/1991 | Ong et al. | |
| 5,231,135 A | 7/1993 | Machell et al. | |
| 5,283,153 A | 2/1994 | Sacripante et al. | |
| 5,621,022 A | 4/1997 | Jaeger et al. | |
| 6,221,137 B1 | 4/2001 | King et al. | |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,381,831 B1 | 6/2008 | Banning et al. | |
| 7,427,323 B1 | 9/2008 | Birau et al. | |
| 8,273,516 B2 | 9/2012 | Wosnick et al. | |
| 2006/0046179 A1 * | 3/2006 | Mang | G03G 9/081 430/109.3 |
| 2010/0055593 A1 * | 3/2010 | Zhou | G03G 9/08793 430/108.4 |

* cited by examiner

*Primary Examiner* — Thorl Chea
(74) *Attorney, Agent, or Firm* — Pillsbury Winthrop Shaw Pittman LLP

(57) ABSTRACT

A block copolymer includes a crystalline polyester block and an amorphous polyalkylsiloxane block, the block copolymer exhibiting baroplastic behavior. The block copolymer is used in a cold pressure fix toner. A method of making a block copolymer including a crystalline polyester block and an amorphous polyalkylsiloxane block includes heating a mixture of a diacid, a diol, and a carbinol-terminated poly (alkylsiloxane).

16 Claims, 4 Drawing Sheets

COLD PRESSURE FIX TONERS COMPRISING CRYSTALLINE CO-POLYESTER-CO-POLY(ALKYLSILOXANE)

BACKGROUND

The present disclosure relates to toner compositions for use in xerography. In particular, the present disclosure relates to cold pressure fix toner compositions.

Cold pressure fix (CPF) toners normally operate in a system employing a pair of high-pressure rollers to fix toner to paper without heating. Among the advantages of such systems are the use of low power and little paper heating. One example of a cold pressure fix toner comprises predominantly wax an ethylene-vinyl acetate copolymer with softening point of 99° C., and a 120° C. softening point polyamide thermoplastic polymer. An example of this approach is shown in U.S. Pat. No. 4,935,324, which is incorporated herein by reference. Another example of a cold pressure fix toner is comprised of a copolymer of styrene with 1-tertiary-butyl-2-ethenyl benzene and a polyolefin wax exemplified for example as Xerox 4060 cold pressure fix toner. Other cold fix toners have been based on a long chain acrylate core produced by suspension polymerization, such as lauryl acrylate. Examples of such compositions are disclosed in U.S. Pat. Nos. 5,013,630 and 5,023,159 which are incorporated herein by reference. Such systems are designed to have a core with a $T_g$ less than room temperature. A hard shell, such as polyurethane prepared by an interfacial polymerization, is disposed about the core in order to keep the liquid content in the core in the toner particle.

Performance issues in designs with high wax content include that they work only at high pressure, such as about 2,000 psi or even 4,000 psi, which are respectively, 140 kgf/cm² and 280 kgf/cm² and even then image robustness can be poor. In the case of long chain acrylate core designs the shell needs to be very thin to break under pressure, but it can be very challenging to prevent the capsules from leaking because the core is typically a liquid at room temperature.

Other material approaches for CPF toner applications employ baroplastics that are nano-phase polymeric materials comprised of two components that can become miscible under pressure thereby facilitating flow. Block copolymers have been employed in which the baroplastic resin comprises of a low $T_g$ and a high $T_g$ component that nano-phase separate (U.S. Pat. No. 8,273,516). The CPF toners made by this strategy have provided moderate cold pressure fix performance. Nonetheless, there still exists a need for materials for cold pressure fix applications.

SUMMARY

In some aspects, embodiments herein relate to block copolymers comprising a crystalline polyester block; and an amorphous poly(alkylsiloxane) block, wherein the block copolymer exhibits baroplastic behavior.

In some aspects, embodiments herein relate to cold pressure fix (CPF) toners comprising a block copolymer, the block copolymer comprising a crystalline polyester block and an amorphous poly(alkylsiloxane) block, a colorant, and optionally a wax.

In some aspects, embodiments herein relate to methods of making a block copolymers comprising a crystalline polyester block and an amorphous poly(alkylsiloxane) block, the method comprising heating a mixture of a diacid, a diol, and a carbinol-terminated poly(alkylsiloxane).

BRIEF DESCRIPTION OF DRAWINGS

Various embodiments of the present disclosure will be described herein below with reference to the figures wherein.

DETAILED DESCRIPTION

Figure 1:
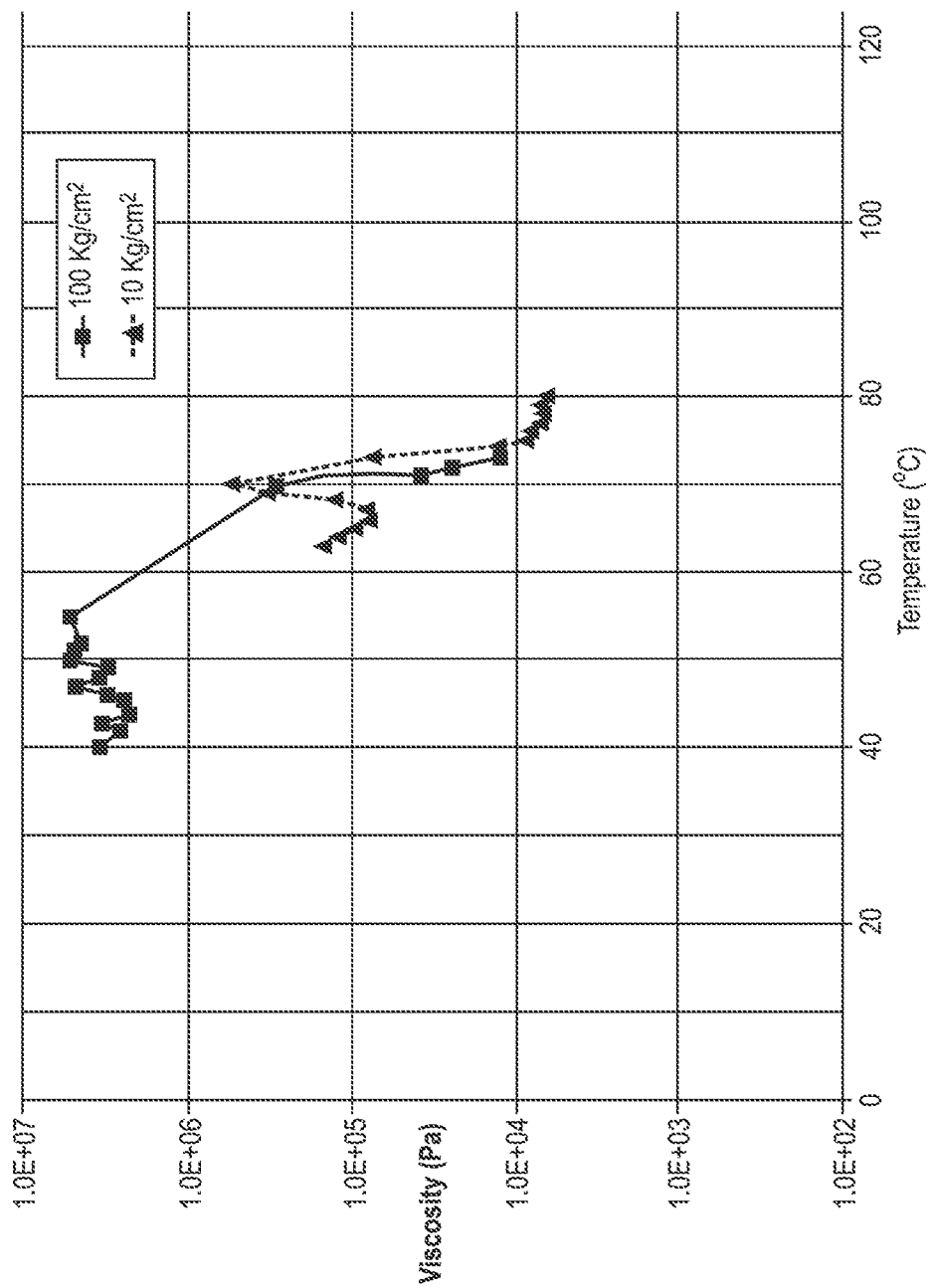
FIG. 1 shows a plot of viscosity versus temperature for Comparative Example 1, a polyester control lacking a poly(alkylsiloxane) block, obtained using a CFT-500D Flowtester™.

Embodiments herein provide cold pressure fix toners based on crystalline co-polyester-co-poly(alkylsiloxane) resins. The toners optionally have an amorphous small molecule ester or polymer resin as a shell component, to provide a material that undergoes a phase change from solid to liquid under pressure.

As used herein, "cold pressure fix toner" or "CPF toner" refers to a toner material designed for application to a substrate and which is affixed to the substrate primarily by application of pressure. While heating may be optionally employed to assist in fixing a CPF toner, one benefit of the compositions disclosed herein is the ability to use reduced heating, or in embodiments, no applied heating. Affixing by application of pressure may be achieved utilizing a Shimadzu Flowtester™ in a broad range of pressures, such as from about 50 kgf/cm² to about 100 kgf/cm² or to about 200 kgf/cm². If necessary it is possible to use higher pressures up to about 400 kgf/cm², however, generally such higher pressures are undesirable, causing calendaring and even wrinkling of the paper which distorts the look and feel of the paper, and requires more robust pressure fix rolls and spring assemblies.

As used herein, the term "baroplastic," used in connection with block copolymers disclosed herein, refers to the copolymer property of undergoing a phase change from solid to liquid under pressure. Baroplastic materials typically comprise a low $T_g$ and a high $T_g$ component that nano-phase separate. Embodiments herein achieve this by providing copolymers comprising a crystalline hydrocarbon resin block with high $T_m$, such as from about 55° C. to about 100° C., and in other embodiments, from about 60° C. to 80° C., and a block of a low $T_g$ of amorphous poly(alkylsiloxane), such as from about −30 t to about 50° C., and in other embodiments, from about −20° C. to 25° C. Inexpensive carbinol terminated polydimethylsiloxanes, in particular, are commercially available with various molecular weights. Reacting these with crystalline resin components such as diacid and diols can generate block copolymers of amorphous co-polydimethylsiloxane resin with crystalline co-polyester according to Scheme I below:

Scheme I

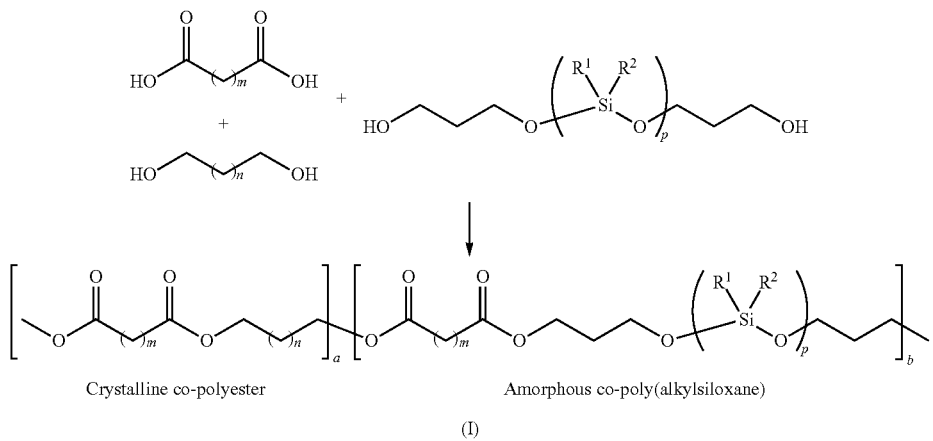

Crystalline co-polyester      Amorphous co-poly(alkylsiloxane)

(I)

wherein $R^1$ and $R^2$ are independently a $C_1$ to $C_4$ alkyl group; a is an integer from 1 to 1000; b is an integer from 1 to 100; m is an integer from 2 to 12; n is an integer from 2 to 12; and p is an integer from 5 to 10,000. The resultant crystalline co-polyester and amorphous co-poly(alkylsiloxane) block resin can provide the requisite nano-phase separation of the block co-poly(alkylsiloxane) from the crystalline co-polyesters.

In embodiments, there are provided block copolymers comprising a crystalline polyester block; and an amorphous poly(alkylsiloxane) block. In embodiments, the block copolymers have a structure of Formula (I):

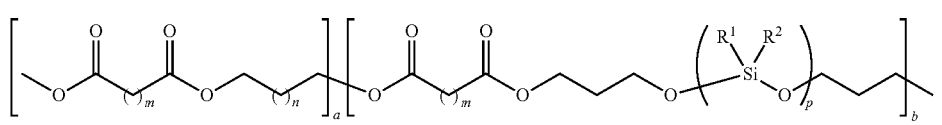

(I)

wherein $R^1$ and $R^2$ are independently a $C_1$ to $C_4$ alkyl group; a is an integer from 1 to 1000; b is an integer from 1 to 100; m is an integer from 2 to 12; n is an integer from 0 to 12; and p is an integer from 5 to 1000. In embodiments, $R^1$ and $R^2$ are methyl. In preferred embodiments, n is 4 to 10. In embodiments m is 6 to 10.

In embodiments, block copolymer has a number average molecular weight ($M_n$) from about 2,000 Daltons to about 50,000 Daltons, or in other embodiments, about 4,000 Daltons to about 10,000 Daltons. In embodiments, the block copolymer has an average molecular weight ($M_w$) from about 5,000 Daltons to about 100,000 Daltons, or in other embodiments, about 10,000 Daltons to about 50,000 Daltons.

In embodiments, there provided cold pressure fix (CPF) toners comprising a block copolymer, the block copolymer comprising a crystalline polyester block, and an amorphous poly(alkylsiloxane) block.

In embodiments, the CPF toners comprise a block copolymer having a structure of Formula (I):

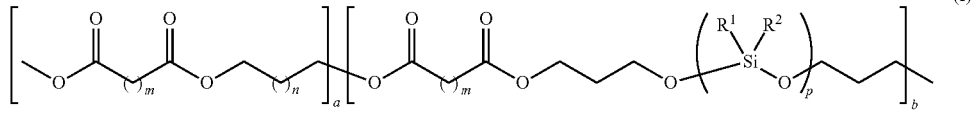

(I)

wherein $R^1$ and $R^2$ are independently a $C_1$ to $C_4$ alkyl group; a is an integer from 1 to 1000; b is an integer from 1 to 100; m is an integer from 2 to 12; n is an integer from 0 to 10; and p is an integer from 5 to 1000. In some such embodiments, $R^1$ and $R^2$ are methyl. In some such embodiments, n is 4 to 12. In some such embodiments, m is 6 to 10.

In embodiments, CPF toners may further comprise a colorant. In embodiments, CPF toners may further comprise one or more agent selected from the group consisting of an antioxidant, a defoamer, a slip agent, a leveling agent, a clarifier, a viscosity modifier, an adhesive, a plasticizer, and combinations thereof.

Numerous suitable waxes may be selected for the toners illustrated herein, and which waxes can be included in the CPF toner.

Examples of optional waxes included polyolefins, such as polypropylenes, polyethylenes, and the like, such as those commercially available from Allied Chemical and Baker Petrolite Corporation; wax emulsions available from Michaelman Inc. and the Daniels Products Company; EPOLENE N-15™ commercially available from Eastman Chemical Products, Inc.; VISCOL 550-P™ a low weight average molecular weight polypropylene available from Sanyo Kasei K.K.; OMNOVA D1509®, available from IGI Chemicals as a wax dispersion and similar materials. Examples of functionalized waxes that can be selected for the disclosed toners include amines, and amides of, for example, AQUA SUPERSLIP 6550™, SUPERSLIP 6530™ available from Micro Powder Inc.; fluorinated waxes, for example, POLYFLUO 190™, POLYFLUO 200™, POLYFLUO 523XF™, AQUA POLYFLUO 411™, AQUA POLYSILK 19™, POLYSILK 14™ available from Micro Powder Inc.; mixed fluorinated, amide waxes, for example, MICROSPERSION 19™ also available from Micro Powder Inc.; imides, esters, quaternary amines, carboxylic acids or acrylic polymer emulsion of, for example, JONCRYL 74™, 89™, 130™, 537™, and 538™, all available from SC Johnson Wax; chlorinated polypropylenes and polyethylenes available from Allied Chemical, Petrolite Corporation, and from SC Johnson Wax. A number of these disclosed waxes can optionally be fractionated or distilled to provide specific cuts or portions that meet viscosity and/or temperature criteria wherein the viscosity is, for example, about 10,000 cps, and the temperature is about 100° C. In embodiments, the wax is selected from the group consisting of polyethylene, polypropylene, and mixtures thereof. In embodiments, the wax has a melting range of from about 70 to about 120° C., or from about 80 to about 100° C., or from about 85 to about 95° C.

In embodiments, the wax is in the form of a dispersion comprising, for example, a wax having a particle diameter of from about 100 nanometers to about 500 nanometers, or from about 100 nanometers to about 300 nanometers, water, and an anionic surfactant or a polymeric stabilizer, and optionally a nonionic surfactant. In embodiments, the wax comprises polyethylene wax particles, such as POLYWAX® 655, or POLYWAX® 725, POLYWAX® 850, POLYWAX® 500 (the POLYWAX® waxes being commercially available from Baker Petrolite) and, for example, fractionated/distilled waxes, which are distilled parts of commercial POLYWAX® 655 designated as X1214, X1240, X1242, X1244, and the like, but are not limited to POLYWAX® 655 cuts. Waxes providing a specific cut that meet the viscosity/temperature criteria, wherein the upper limit of viscosity is about 10,000 cps and the temperature upper limit is about 100° C., can be used. These waxes can have a particle diameter in the range of from about 100 to about 500 nanometers, although not limited to these diameters or sizes. Other wax examples include FT-100 waxes available from Shell (SMDA), and FNP0092 available from Nippon Seiro.

The surfactant used to disperse the wax can be an anionic surfactant, such as, for example, NEOGEN RK® commercially available from Daiichi Kogyo Seiyaku or TAYCAPOWER® BN2060 commercially available from Tayca Corporation, or DOWFAX® available from DuPont.

In embodiments, wax can be present in the toner in any suitable or desired amount. In the present embodiments, the wax may be present in the toner in a lower amount than previously required, such as from 2 to about 15, or from about 2 to about 13, or from about 4 to about 10, or from about 4 to about 6 percent by weight based on the total weight of the toner solids. In a specific embodiment, the wax is present in the toner in an amount of from about 4 to about 6 percent by weight, based on the total weight of toner solids. The toner wax amount can in embodiments be, for example, from about 0.1 to about 20 weight percent or percent by weight, from about 0.5 to about 15 weight percent, from about 1 to about 12 weight percent, from about 1 to about 10 weight percent, from about 2 to about 8 weight percent, from about 4 to about 9 weight percent, from about 1 to about 5 weight percent, from about 1 to about 4 weight percent, or from about 1 to about 3 weight percent based on the toner solids. In embodiments, the wax is present in an amount of from about 2 to about 13 percent by weight, based on the total weight of the toner. In a specific embodiment, the wax is present in an amount of from about 4 to about 5 weight percent based on the total weight of the toner.

In embodiments, the CPF toners may further comprise a shell. In embodiments, the shell comprises an amorphous small molecule ester or a polymer resin. Examples of amorphous polyesters, selected as a replacement for the prior art resin mixtures of a first resin of, for example, a terpoly-(propoxylated bisphenol A terephthalate) terpoly-(propoxylated bisphenol A-dodecenylsuccinate) terpoly-(propoxylated bisphenol A-fumarate) (Comparative Example A), a terpoly-(propoxylated bisphenol A-terephthalate) terpoly-(propoxylated bisphenol A-dodecenylsuccinate)-terpoly-(ethoxylated bisphenol A terephthalate) terpoly-(ethoxylated bisphenol A-dodecenylsuccinate)-terpoly-(propoxylated bisphenol A-trimellitate)-terpoly-(ethoxylated bisphenol A-trimellitate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), and terpoly(propoxylated bisphenol A-terephthalate)-terpoly(propoxylated bisphenol A-dodecenylsuccinate)-terpoly(propoxylated bisphenol A-fumarate), mixtures thereof, and the like.

The amorphous polyester resins can possess, for example, a number average molecular weight (Mn), as measured by gel permeation chromatography (GPC) of, for example, from about 5,000 to about 100,000, from about 10,000 to about 75,000, or from about 5,000 to about 50,000. The weight average molecular weight (Mw) of the amorphous polyester resins can be, for example, from about 2,000 to about 100,000, from about 15,000 to about 85,000, or from about 5,000 to about 80,000, as determined by GPC using polystyrene standards. The broad molecular weight distribution (Mw/Mn) or polydispersity of the amorphous polyester resin is, for example, from about 2 to about 8, from about 2 to about 6, and from about 3 to about 5.

In embodiments, there are provided methods of making a block copolymer comprising a crystalline polyester block and an amorphous polyalkylsiloxane block, the method comprising heating a mixture of a diacid, a diol, and a carbinol-terminated poly(alkylsiloxane). In particular embodiments, methods may be used to make the block copolymer having a structure of Formula (I):

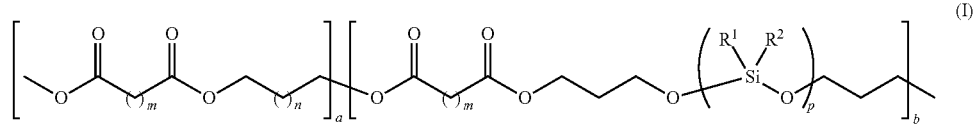

wherein $R^1$ and $R^2$ are independently a $C_1$ to $C_4$ alkyl group; a is an integer from 1 to 1000; b is an integer from 1 to 100;

m is an integer from 1 to 12; n is an integer from 0 to 10; and p is an integer from 5 to 1000.

In embodiments, if a heating step is performed along with pressure application to fix the toner a temperature may be in a range from about 25° C. to about 130° C., at a heating rate of from about 1° C. to about 20° C. per minute.

In embodiments, the crystalline component of the copolymer is a polyester. Crystalline polyester can be prepared from a diacid and a diol. Examples of organic diols selected for the preparation of crystalline polyester resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like. The aliphatic diol is, for example, selected in an amount of from about 45 to about 55 mole percent of the resin.

Examples of organic diacids or diesters selected for the preparation of the crystalline polyester resins include oxalic acid, succinic acid, glutaric acid, adipic acid, suberic acid, azelaic acid, sebacic acid, dodecanedioic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, from about 45 to about 55 mole percent of the resin.

For cold pressure fixable toner it may be desirable to have the toner material flow near room temperature under the applied pressure of the cold pressure fixing system, to enable the toner to flow over the substrate surface and into pores or fibers in the substrate, as well as to enable the toner particles to flow into each other, thus providing a smooth continuous toner layer that is effectively adhered to the substrate. The flow can be measured utilizing the CFT-500D Flowtester™, available from Shimadzu Corporation. It may be desirable that the pressure applied be relatively low compared to the prior art, such as about 100 kgf/cm². However, in embodiments the pressure can be higher, up to about 400 kgf/cm², or lower, as little as 5 kgf/cm², provided that the above described conditions for onset of toner flow and flow viscosity can be met. In embodiments, some heat may be applied to preheat the toner or the paper prior to entry to the cold pressure fixing system, which can enable cold pressure fix for temperatures somewhat above room temperature.

In embodiments, it may be desirable for cold pressure fix that under low pressures, such as about 10 kgf/cm² applied pressure the cold pressure fix toner does not flow significantly such that the toner particles stick together, for example in the toner cartridge, or in the printer, including in the developer housing, or on the imaging surfaces such as the photoreceptor, or in embodiments the intermediate transfer belt. In shipping or in the printer the temperature may rise to as much as 50° C., thus in embodiments it may be desirable that the toner does not flow significantly to allow the particles stick together up to 50° C. at about 10 kgf/cm². Thus, in embodiments the temperature for the viscosity of the material to be reduced to a value of about 10,000 Pa-s, for the cold pressure fix toner at a lower pressure of about 10 kgf/cm² applied pressure, is from about 50° C. to about 70° C., in embodiments about 55° C. to about 70° C., in embodiments about 60° C. to about 90° C., or in further embodiments at about 20 kgf/cm² to about 40 kgf/cm².

Thus it may be desirable to have a high temperature for material flow at low pressures representative of storage and usage in the printer, and a low temperature for material at the desired higher cold pressure fix pressure. In embodiments there is a temperature shift calculated in the range from about 10° C. to about 60° C. where the flow viscosity of the cold pressure fix composition equal to about 10,000 pascal-seconds, when the applied pressure on the cold pressure fix composition is increased from 10 to 100 Kgf/cm². In such embodiments, the temperature shift can be calculated as:

$$\Delta T_{\eta}=10000=T_{\eta}=10000(10\ kgf/cm2)-T_{\eta}=10000(100\ kgf/cm2)$$

where $T_{\eta}=10000(10\ kgf/cm^2)$ is the temperature for flow viscosity η of 10000 Pa-s at 10 kgf/cm² applied pressure and $T_{\eta}=10000(100\ kgf/cm^2)$ is the temperature for flow viscosity η of 10000 Pa-s at 100 kgf/cm². In other embodiments the low pressure for storage and printer usage applied can be in the range of about 10 kgf/cm² to about 40 kgf/cm², and the high pressure for applied for cold pressure fix can be in the range of about 25 kgf/cm² to about 400 kgf/cm².

Toners can be prepared from the block copolymers disclosed herein by any means, including conventional extrusion and grinding, suspension, SPSS (Spherical Polyester Toner by Suspension of Polymer/Pigment Solution and Solvent Removal Method., as described in Journal of the Imaging Society of Japan, Vol. 43, 1, 48-53, 2004), incorporated in an N-Cap toner, (encapsulated toner, as described for example in U.S. Pat. No. 5,283,153 and incorporated in an emulsion aggregation toner, optionally with a shell. Where needed for toner applications, latexes can be made incorporating the crystalline and/or amorphous mixtures, prepared by solvent flash, by phase inversion emulsification, including by solvent free methods.

Other additives may be present in the CPF toners disclosed here. The CPF toner compositions of the present embodiments may further optionally include one or more conventional additives to take advantage of the known functionality associated with such conventional additives. Such additives may include, for example, colorants, antioxidants, defoamer, slip and leveling agents, clarifier, viscosity modifier, adhesive, plasticizer and the like. When present, the optional additives may each, or in combination, be present in the CPF toner in any desired or effective amount, such as from about 1% to about 10%, from about 5% to about 10%, or from about 3% to about 5% by weight of the CPF toner.

In a typical CPF toner composition antioxidants are added for preventing discoloration of the small molecule composition. In embodiments, the antioxidant material can include IRGANOX® 1010; and NAUGARD® 76, NAUGARD® 445, NAUGARD® 512, and NAUGARD® 524. In embodiments, the antioxidant is NAUGARD® 445. In other embodiments the antioxidant material can include MAYZO® BNX® 1425 a calcium salt of phosphonic acid, and MAYZO® BNX® 358 a thiophenol both available commercially from MAYZO®, and ETHANOX® 323A a nonylphenol disulfide available commercially from SI Group.

In embodiments, CPF toners disclosed herein may further comprise a plasticizer. Exemplary plasticizers may include Uniplex 250 (commercially available from Unitex), the phthalate ester plasticizers commercially available from Ferro under the trade name SANTICIZER®, such as dioctyl phthalate, diundecyl phthalate, alkylbenzyl phthalate (SANTICIZER® 278), triphenyl phosphate (commercially available from Ferro), KP-140, a tributoxyethyl phosphate (commercially available from Great Lakes Chemical Corporation), MORFLEX® 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 to about 30 percent, from about 0.1 to about 25 percent, from about 1 to about 20 percent by weight of the CPF toner.

In embodiments, the cold pressure fix toner compositions described herein also include a colorant. Any desired or effective colorant can be employed in the cold pressure fix toner compositions, including dyes, pigments, mixtures thereof. Any dye or pigment may be chosen, provided that it is capable of being dispersed or dissolved in the CPF toner and is compatible with the other CPF toner components. Any conventional cold pressure fix toner colorant materials, such as Color Index (C.I.) Solvent Dyes, Disperse Dyes, modified Acid and Direct Dyes, Basic Dyes, Sulphur Dyes, Vat Dyes, fluorescent dyes and the like. Examples of suitable dyes include NEOZAPON® Red 492 (BASF); ORASOL® Red G (Pylam Products); Direct Brilliant Pink B (Oriental Giant Dyes); Direct Red 3BL (Classic Dyestuffs); SUPRANOL® Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); CARTASOL® Brilliant Yellow 4GF (Clariant); Cibanone Yellow 2G (Classic Dyestuffs); ORASOL® Black RLI (BASF); ORASOL® Black CN (Pylam Products); Savinyl Black RLSN (Clariant); Pyrazol Black BG (Clariant); MORFAST® Black 101 (Rohm & Haas); Diaazol Black RN (ICI); THERMOPLAST® Blue 670 (BASF); ORASOL® Blue GN (Pylam Products); Savinyl Blue GLS (Clariant); LUXOL® Fast Blue MBSN (Pylam Products); Sevron Blue 5GMF (Classic Dyestuffs); BASACID® Blue 750 (BASF); KEYPLAST® Blue (Keystone Aniline Corporation); NEOZAPON® Black X51 (BASF); Classic Solvent Black 7 (Classic Dyestuffs); SUDAN® Blue 670 (C.I. 61554) (BASF); SUDAN® Yellow 146 (C.I. 12700) (BASF); SUDAN® Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the cold pressure fix toners. Examples of suitable pigments include PALIOGEN® Violet 5100 (BASF); PALIOGEN® Violet 5890 (BASF); HELIOGEN® Green L8730 (BASF); LITHOL® Scarlet D3700 (BASE); SUNFAST® Blue 15:4 (Sun Chemical); HOSTAPERM® Blue B2G-D (Clariant); HOSTAPERM® Blue B4G (Clariant); Permanent Red P-F7RK; HOSTAPERM® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); SUDAN® Blue OS (BASF); NEOPEN Blue FF4012 (BASF); PV Fast Blue B2GO1 (Clariant); IRGALITE Blue GLO (BASF); PALIOGEN® Blue 6470 (BASF); SUDAN® Orange G (Aldrich); SUDAN® Orange 220 (BASF); PALIOGEN® Orange 3040 (BASF); PALIOGEN® Yellow 152, 1560 (BASF); LITHOL® Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the CPF toner may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the CPF toner carriers disclosed herein. Examples of suitable spirit solvent dyes include NEOZAPON® Red 492 (BASF); ORASOL® Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); CARTASOL® Brilliant Yellow 4GF (Clariant); PERGASOL® Yellow 5RA EX (Classic Dyestuffs); ORASOL® Black RLI (BASF); ORASOL® Blue GN (Pylam Products); Savinyl Black RLS (Clariant); MORFAST® Black 101 (Rohm and Haas); THERMOPLAST® Blue 670 (BASF); Savinyl Blue GLS (Sandoz); LUXOL® Fast Blue MBSN (Pylam); Sevron Blue 5GMF (Classic Dyestuffs); BASACID® Blue 750 (BASF); KEYPLAST® Blue (Keystone Aniline Corporation); NEOZAPON® Black X51 (C.I. Solvent Black, C.I. 12195) (BASF); SUDAN® Blue 670 (C.I. 61554) (BASF); SUDAN® Yellow 146 (C.I. 12700) (BASF); SUDAN® Red 462 (C.I. 260501) (BASF), mixtures thereof and the like.

The colorant may be present in the cold pressure fix toner in any desired or effective amount to obtain the desired color or hue such as, for example, at least from about 0.1 percent by weight of the CPF toner to about 50 percent by weight of the CPF toner, at least from about 0.2 percent by weight of the CPF toner to about 20 percent by weight of the CPF toner, and at least from about 0.5 percent by weight of the CPF toner to about 10 percent by weight of the CPF toner. The colorant may be included in the CPF toner in an amount of from, for example, about 0.1 to about 15% by weight of the CPF toner, or from about 0.5 to about 6% by weight of the CPF toner.

EXAMPLES

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Comparative Example 1

This Example describes the synthesis of a crystalline polyester derived from dodecanedioic acid and nonane-diol glycol (m=10, n=7) without any polydimethylsiloxane.

A 2-L buchi reactor was charged with 632 g of dodecanedioic acid, 540 g of nonanediol and 3 grams of FASCAT 4100 available from Elf Atochem. The mixture was slowly heated to 225° C., over a three hour period and then maintained at 225° C. for seven additional hours. The resin was then discharged through and left to cool to room temperature.

Example 2

This Example describes the synthesis of a crystalline co-polyester-co-poly(dimethylsiloxane) (95% by weight of co-polyester-derived from dodecanedioic acid and ethylene glycol (m=10, n=0) with 5% by weight of co-polydimethylsiloxane.

A 2-L buchi reactor was charged with 624 g of dodecanedioic acid, 337 g of ethylene glycol and 50 grams of carbinol terminated polydimethylsiloxane available from Gelest, Inc. with a viscosity of about 50 to about 60 poise, and 3 grams of FASCAT 4100 available from Elf Atochem. The mixture was slowly heated to 225° C., over a three hour period, and then maintained at 225° C. for additional five hours. The co-polyester-co-polydimethylsiloxane was comprised of about 95% crystalline co-polyester and about 5% co-polydimethylsiloxane (PDMS):

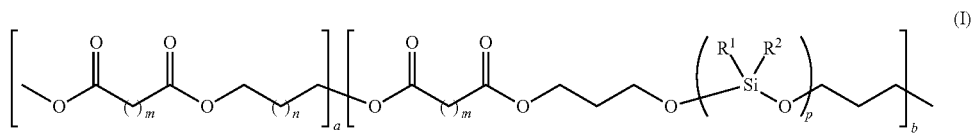

(I)

wherein m=10 and n=0, $R^1$ and $R^2$ are methyl.

Example 3 to 10

A series of co-Polyester-co-polydimethylsiloxane were prepared with varying co-polyester and co-polydimethylsiloxane ratio by the procedure of Example 1. The thermal and analytical results are listed in Table 1. The acid value was obtained using tetrahydrofuran as the solvent and potassium methoxide as the titrant and using phenolphthalein as the indicator. The viscosity was obtained using the CAP 2000+ Viscometer available from Brookfield at 100° C. The melting point, re-crystallization temperature and heat of fusion were obtained by Differential Scanning Calorimetry at a heating and cooling rate of 10 t/minute. The molecular weight average ($M_w$) and weight number ($M_n$) was obtained by Gel Permeation chromatography using polystyrene standards.

TABLE 1

Resin Properties

| Resin | A % | B n:m | % | Acid Value mg/KOH g | Viscosity Poise | Melting Point °C. | Crystallization Temperature °C. | Heat of Fusion joules/g | Molecular Weight g/mole Mn | Mw |
|---|---|---|---|---|---|---|---|---|---|---|
| Comparative Example 1 | 0 | 10:7 | 100 | 10.5 | 47 | 76 | 60 | 140 | 10,400 | 22,100 |
| Example 2 | 5 | 10:0 | 95 | 3.8 | 7.1 | 83.5 | 62.9 | 72.1 | 5,066 | 12,091 |
| Example 3 | 10 | 10:0 | 90 | 2.41 | 7.7 | 82.9 | 60.7 | 98.9 | 5,554 | 12,556 |
| Example 4 | 15 | 10:0 | 85 | 3.14 | 11.3 | 81.3 | 59.1 | 83.5 | 7,232 | 16,421 |
| Example 5 | 5 | 10:7 | 95 | 19.3 | 10.7 | 71.9 | 58.8 | 131.6 | 8.085 | 15,202 |
| Example 6 | 10 | 10:7 | 90 | 12.4 | 29.2 | 70.3 | 57.3 | 125.3 | 10,063 | 21,210 |
| Example 7 | 15 | 10:7 | 85 | 10.4 | 18.1 | 68.9 | 55.7 | 117.7 | 8,220 | 18,623 |
| Example 8 | 5 | 8:4 | 95 | 9.7 | 19.8 | 64.8 | 49.6 | 113.5 | 7,159 | 16,305 |
| Example 9 | 10 | 8:4 | 90 | 14.7 | 19.4 | 63.9 | 51.2 | 111.9 | 6,895 | 16,117 |
| Example 10 | 15 | 8:4 | 85 | 13.4 | 16.4 | 62.6 | 46.6 | 98.01 | 6,570 | 15,812 |

A = Co-Polydimethylsiloxane;
B = Co-Polyester (n:m are integers from Formula (I))

Figure 2:
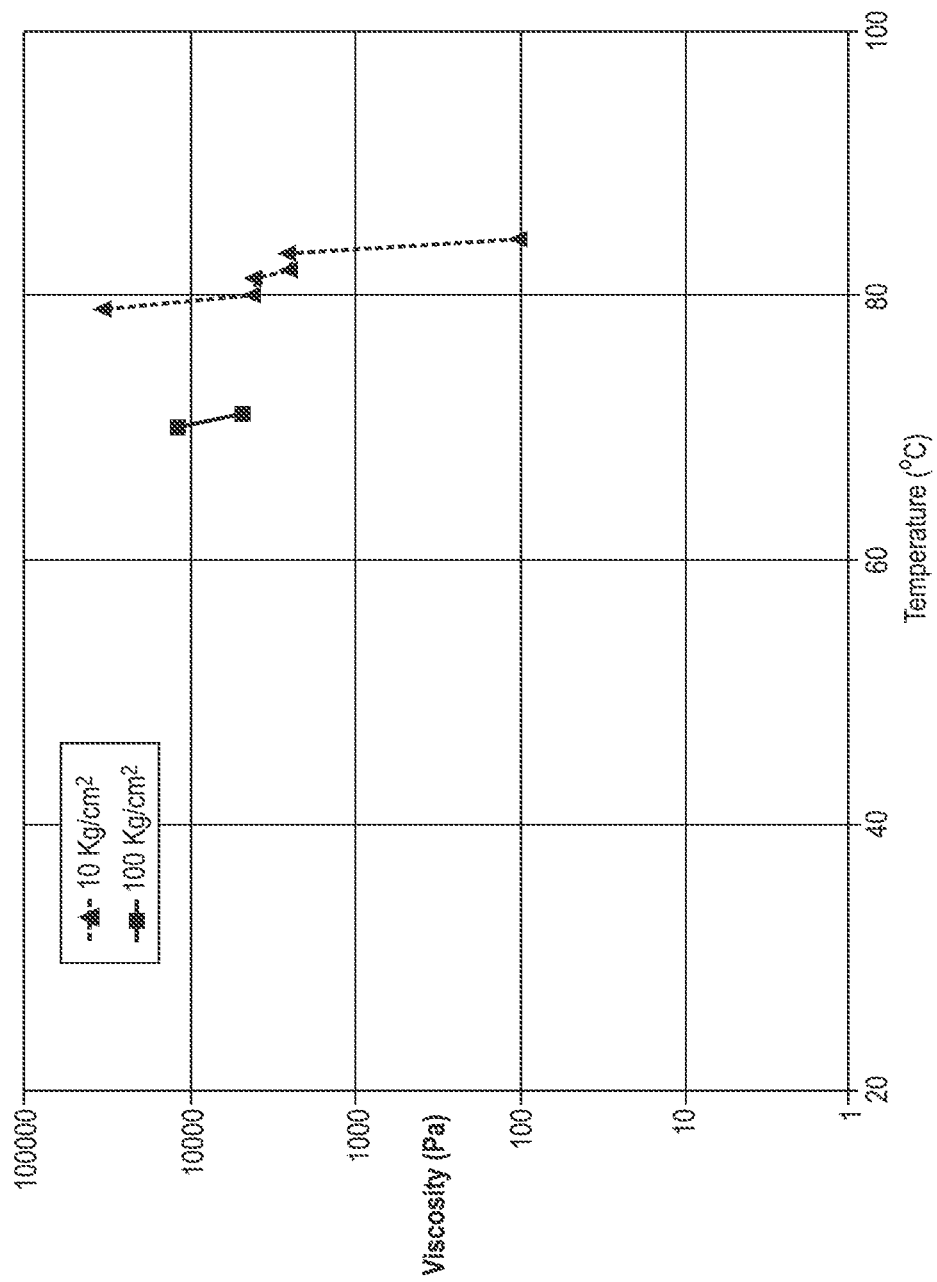
FIG. 2 shows a plot of viscosity versus temperature for Example 4, an exemplary co-polyester co-poly(alkylsiloxane) block copolymer, obtained using a CFT-500D Flowtester™.
Figure 3:
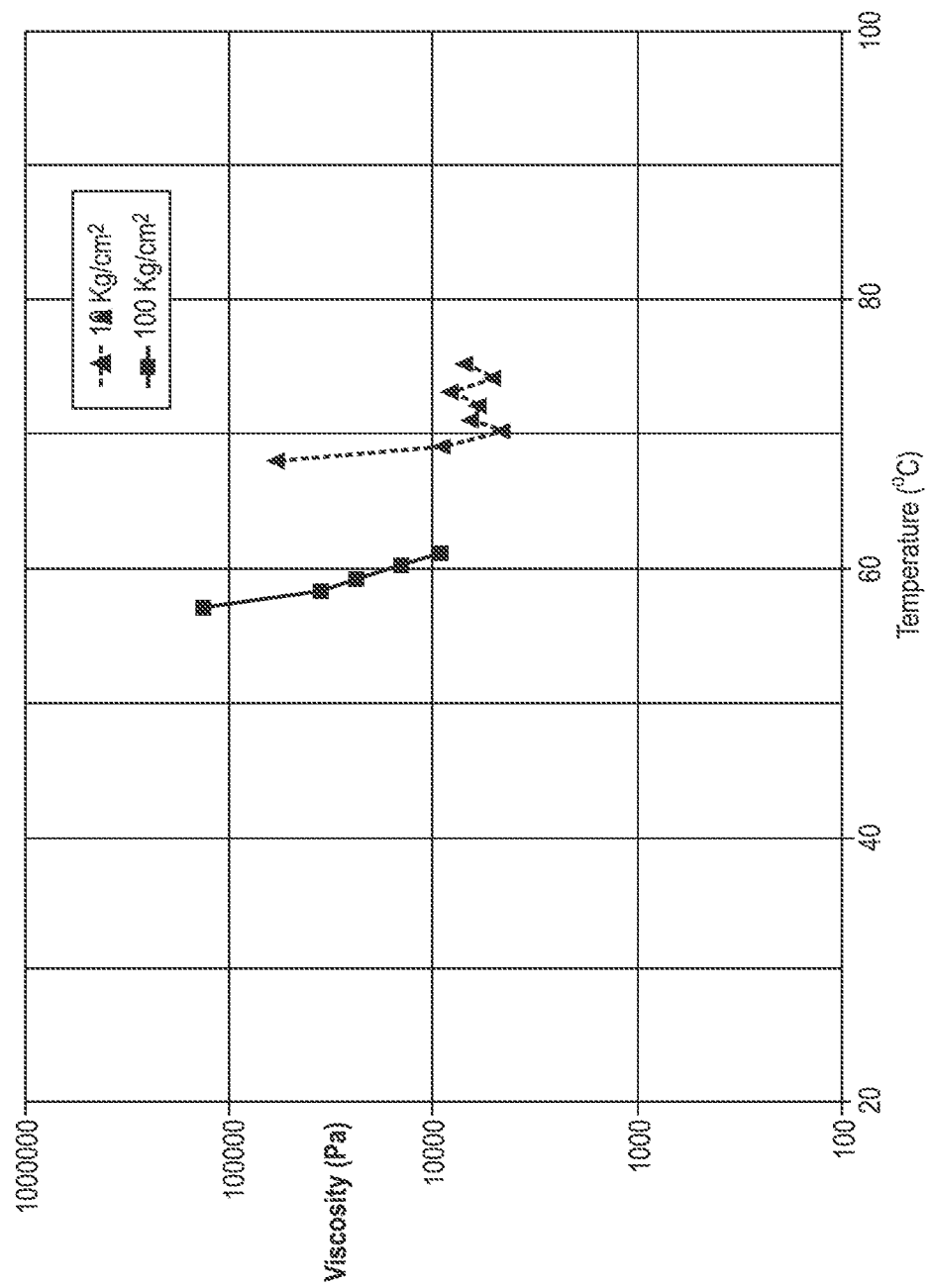
FIG. 3 shows a plot of viscosity versus temperature for Example 7, a further exemplary co-polyester co-poly(alkylsiloxane) block copolymer, obtained using a CFT-500D Flowtester™.
Figure 4:
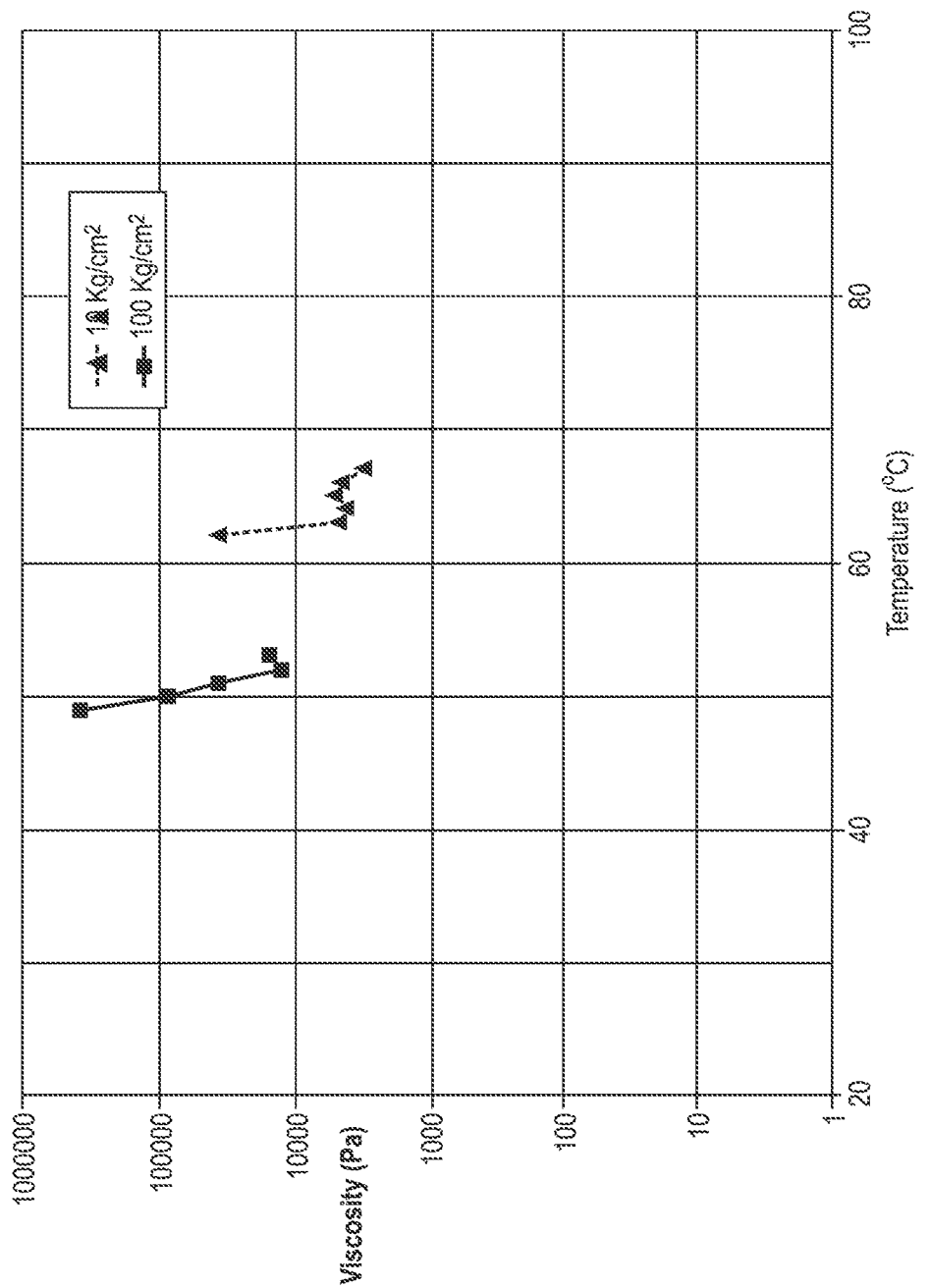
FIG. 4 shows a plot of viscosity versus temperature for Example 10, a still further exemplary co-polyester co-poly(alkylsiloxane) block copolymer, obtained using a CFT-500D Flowtester™.

From the above resins, Comparative Example 1, and Examples 4, 7 and 10, were evaluated utilizing the CFT-500D Flowtester™ at both 10 and 100 Kg/cm² pressure at a temperature range from 20° C. to 100° C. The results are shown in FIGS. 1 to 4. FIG. 1, which characterizes the crystalline resin of comparative example 1, shows no baroplastic effect as the temperature difference between 10 and 100 Kg/cm² pressure does not show any difference in viscosity versus temperature behavior. This is expected, as the resin of Comparative Example 1, does not comprise co-blocks of polyester with polydimethylsiloxane. The copolymers of Examples 4, 7 and 10 comprised of selected co-polyester-co-polydimethylsiloxane are illustrated in FIGS. 2, 3 and 4, respectively. In each of these latter resins, a difference of 10° C. to about 20° C. drop in viscosity versus temperature can be seen when these resins are subjected from 10 to 100 Kg/cm² pressure, demonstrating that they are all baroplastic materials.

Example 11

This Example describes the synthesis of a CPF toner from the block copolymer of Example 5 (94% by weight) and Cyan Pigment (6% by weight).

A latex was first generated by a Phase Inversion Process: In a 1 Liter Buchi reactor, equipped with a mechanical anchor blade, and distillation apparatus, was added 200 grams of the block copolymer of Example 5, 120 grams of methyl ethyl ketone, and 6 g of isopropanol. The mixture was heated to 65° C. and after dissolution of the resin, 12 grams of 10% ammonium hydroxide was added. To this mixture was then added 300 grams of water dropwise at a rate of 1 gram per minute. A latex resulted, and the organic solvent (methyl ethyl ketone and isopropanol) was distilled off. The latex was then screened through a 20 micron sieve. The particle size was measured to be 141.4 nm with a solids content of 42% by weight.

In a 1 L glass kettle, equipped with a mechanical anchor blade, was charged with 223 grams of the above latex, 18.1 grams of cyan pigment dispersion (33% by weight) available from Sun Chemicals, 3 grams of sodium dodecyl benzene sulfonate surfactant, and 76 grams of water. The resulting mixture was adjusted to a pH of 4.5 using 0.3M aqueous nitric acid solution. Then 2.1 grams of aluminum sulphate mixed with 9.4 grams of water was added to the mixture under homogenization at 3000 to 4000 revolution per minute (rpm). The reactor agitator was set to 230 rpm and heated to 40° C. to aggregate the resin and pigment particles. When the toner particle size reached 6.5 microns, the pH of the slurry was adjusted to 9.0 using a 4% NaOH solution and the agitator was decreased to 160 rpm. The reactor was then heated to 50° C., and the pH was maintained at 8.5 for 2 hours, during which the toner aggregates coalesced to form the toner particle. The mixture was then discharged into a container of cold water (1 Liter). The toner was then filtered off, washed repeatedly with water and freeze dried. The final particle size was 6.4 microns.

Example 12 to 14

A series of CPF Toners were then prepared following the above procedure with block copolymer resins and colorants. The properties are listed in Table 2.

TABLE 2

| Toner | Block Copolymer (94%) | Colorant (6%) | Particle Size microns |
|---|---|---|---|
| Example 11 | Example 5 | Cyan | 6.4 |
| Example 12 | Example 6 | Cyan | 7.2 |
| Example 13 | Example 7 | Black | 5.8 |
| Example 14 | Example 10 | Black | 6.0 |

Cold Pressure Fixture

A cold pressure fixture was utilized with a process speed of 243 mm/s, a variable nip pressure load area of 1000 PSI (6.9 MPa) and 1500 PSI (10.3 MPa) and a with a roll contact length of 70 mm. The pressure was maintained at a constant pressure of 5 Kg/cm² (82 lb/inch²). Toner Images on paper were generated using the Xerox 800 printer with the fusing fixture disabled. The unfused prints were then subjected to the above cold pressure fixture. Imabe permanence was then evaluated using the Taber Linear Abraser (Model 5700), with a Crock cloth attachment. The images were rubbed 10 cycles, 60 cycles per minute. All of the above toners displayed excellent toner fix to paper and none to minimal removal of toner image onto the Crock cloth during the Taber test.

What is claimed is:

1. A block copolymer comprising:
 a crystalline polyester block; and
 an amorphous poly(alkylsiloxane) block,
 wherein the block copolymer exhibits baroplastic behavior and the block copolymer has a structure of Formula (I):

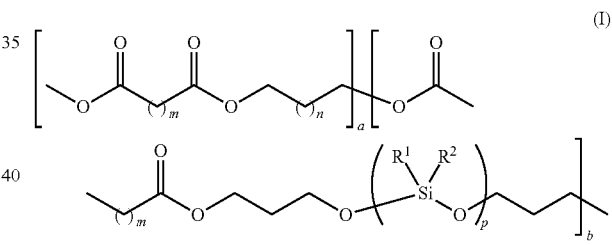

wherein $R^1$ and $R^2$ are independently a $C_1$ to $C_4$ alkyl group; a is an integer from 1 to 1000; b is an integer from 1 to 100; m is an integer from 1 to 12; n is an integer from 0 to 10; and p is an integer from 5 to 1000.

2. The block copolymer of claim 1, wherein $R^1$ and $R^2$ are methyl.

3. The block copolymer of claim 1, wherein n is 4.

4. The block copolymer of claim 1, wherein m is 8.

5. The block copolymer of claim 1, wherein the block copolymer has a number average molecular weight ($M_n$) from about 2,000 Daltons to about 50,000 Daltons.

6. The block copolymer of claim 1, wherein the block copolymer has an average molecular weight ($M_w$) from about 5,000 Daltons to about 100,000 Daltons.

7. The block copolymer of claim 1, wherein the baroplastic behavior results in a temperature shift in a range from about 5° C. to about 40° C. when viscosity is measured at 10 kg/cm² versus 100 kg/cm².

8. A cold pressure fix (CPF) toner comprising:
 a colorant;
 an optionally a wax; and
 a block copolymer, wherein the block copolymer comprising a crystalline polyester block, an amorphous poly(alkylsiloxane) block; further wherein the block copolymer has a structure of Formula (I):

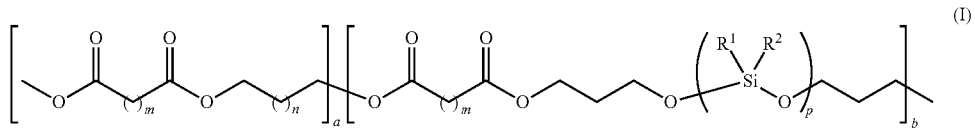 (I)

wherein $R^1$ and $R^2$ are independently a $C_1$ to $C_4$ alkyl group; a is an integer from 1 to 1000; b is an integer from 1 to 100; m is an integer from 1 to 12; n is an integer from 0 to 10; and p is an integer from 5 to 1000.

9. The CPF toner of claim 8, wherein $R^1$ and $R^2$ are methyl.

10. The CPF toner of claim 8, wherein n is 4.

11. The CPF toner of claim 8, wherein m is 8.

12. The CPF toner of claim 8, wherein block copolymer has a molecular weight from about 1,000 Daltons to about 100,00 Daltons.

13. The CPF toner of claim 8, wherein the block copolymer has a molecular weight from about 4,000 Daltons to about 30,000 Daltons.

14. The CPF toner of claim 8, further comprising one or more agent selected from the group consisting of an antioxidant, a defoamer, a slip agent, a leveling agent, a clarifier, a viscosity modifier, an adhesive, a plasticizer, and combinations thereof.

15. The CPF toner of claim 8, wherein a wax is selected as a polyethylene or polypropylene.

16. The CPF toner of claim 8, further comprising a shell, wherein the shell comprises an amorphous polyester resin selected as a terpoly-(propoxylated bisphenol A terephthalate) terpoly-(propoxylated bisphenol A-dodecenylsuccinate) terpoly-(propoxylated bisphenol A-fumarate), a terpoly-(propoxylated bisphenol A-terephthalate) terpoly-(propoxylated bisphenol A-dodecenylsuccinate)-terpoly-(ethoxylated bisphenol A terephthalate) terpoly-(ethoxylated bisphenol A-dodecenylsuccinate)-terpoly-(propoxylated bisphenol A-trimellitate)-terpoly-(ethoxylated bisphenol A-trimellitate), poly(ethoxylated bisphenol co-fumarate), poly(butyloxylated bisphenol co-fumarate), poly(co-propoxylated bisphenol co-ethoxylated bisphenol co-fumarate), and poly(1,2-propylene fumarate).

\* \* \* \* \*